3,316,159
PROCESS FOR MAKING A HIGH SURFACE AREA ELECTRODE
Demetrios V. Louzos, Rocky River, Ohio, assignor to Union Carbide Corporation, a corporation of New York
No Drawing. Filed Dec. 31, 1963, Ser. No. 334,913
4 Claims. (Cl. 204—23)

The present invention relates to electrodes for use in rechargeable batteries.

At the present time the usual commercial techniques employed in the manufacture of electrodes for use in rechargeable batteries involve extensive processing including repeated impregnation steps and electroforming. These methods are expensive not only on account of the cost of the processing materials but also because of the time involved in the required repetition of the processing steps.

It is therefore an object of the present invention to provide a high quality electrode suitable for use in rechargeable batteries which can be easily and economically produced.

Other objects will be apparent from the following description and claims.

An electrode in accordance with the present invention comprises a body of compressed electrically conductive particles having an electrolytically deposited coating. The particle coating for anodes in accordance with the present invention is cadmium, silver, lead, or zinc and the coating for cathodes is nickel oxide, lead oxide, or silver oxide.

In the practice of a particular embodiment of the present invention for making a cadmium electrode, a cadmium salt, e.g. $CdI_2$, in finely divided form, is dry tumbled with a high surface area conductive material such as acetylene black. An organic binder, e.g. a polyvinyl formal resin, may also be included in the mix. A suitable binder of this type is polyvinyl Formvar.

After the materials are blended, the mix is compressed at about 8 tons/in.$^2$ preferably on a conductive support such as an expanded metal grid. The grid then serves to support the mix and also provides improved electronic conduction therein.

Subsequent to the compression molding of the mix, the resulting body is immersed in an aqueous media whereupon the $CdI^2$ in the mix dissolves thus liberating Cd ions in liquid filled pockets throughout the compressed mixture. The body is energized as a cathode while immersed, and current is applied thereto to deposit the cadmium ions as elemental cadmium onto the conductive particles. A suitable range for current in this step is 20 to 125 ma. per square inch of the apparent surface of the compressed body. This current is applied until the cadmium material is substantially reduced to the metallic state and electrodeposited on the conductive particles of the compressed body. When the electrodeposition has been suitably completed the compressed body is removed from the aqueous media and excess liquid is removed. It is not necessary to dry the body completely and simply blotting or draining is sufficient for this purpose. Rinsing the body with water after removal from the aqueous media will serve to wash away any remaining cadmium salt.

After the foregoing treatment, the resulting article can be inserted in a cell and used immediately as an electrode.

A particular advantage of the thus produced electrode is that it has an inherently high porosity by virtue of the channels which result from the dissolution of the cadmium salt. In use, these channels permit penetration of electrolyte and thus improve the operating characteristics of the electrode.

In making electrodes in accordance with the present invention the preferred conductive materials are acetylene black, graphite, iron, and nickel powder. When preparing zinc electrodes as hereinafter described, zinc powder can also be used as the conductive material, and when preparing silver oxide electrodes as hereinafter described, silver powder can be used as the conductive material. Similarly, lead powder can also be used in making lead electrodes.

A suitable sizing range for the conductive materials is 60 to 300 mesh with 20 to 80 mesh being preferred for lead, zinc, or silver powders.

The ionizable cadmium materials which are used in the practice of the present invention include soluble salts, compounds and metal complexes which provide in solution a cadmium ion from which cadmium can be electrodeposited onto the compressed conductive material. Suitable cadmium materials are as follows: cadmium acetate, cadmium sulfate, cadmium borotungstate, cadmium bromate, cadmium chlorate, cadmium fluoborate, calmium fluogallate, cadmium fluosilicate, cadmium formate, cadmium lactate, cadmium bromide, cadmium iodide and cadmium chloride. Mixtures of the foregoing material and the inclusion of materials customarily used in the preparation of plating baths may be optionally employed.

In addition to the above, complexes can be used for example, by providing a mixture of CdO and NaCN, or CdO and KCN, with the conductive material in the pressed body and then using an aqueous KOH solution (4 N) in electrolyzing the pressed mixture to form an electrode. The cadmium containing ion formed by this technique is $Cd(CN)_4^=$.

The aforedescribed cadmium materials are also used in finely divided form and a suitable sizing is in the range of 20 to 400 mesh.

The mixing of the materials used in making the electrode can be accomplished using conventional apparatus such as tumble blenders. In the course of mixing, an organic binder and a small amount of water may also be added to the mix to facilitate the subsequent compression molding of the mixture.

To further improve the final porosity of the electrode, amounts of powdered KOH can be added, e.g. up to 15 percent by weight of the mixture, in those instances where cadmium electrodeposition occurs from alkaline soluble complexes of cadmium such as $Cd(CN)_4^=$. In other instances, a soluble salt, preferably one having the same negative ion as the metal salt employed in forming the electrode, is used in place of KOH. For example KI is preferably used to increase porosity when $CdI_2$ is employed in the making of the electrode. Potassium chloride or potassium acetate are also suitable in this instance.

The KOH or other addition dissolves during the further processing of the compressed mixture and thus provides increased electrode porosity and additional channels for electrolyte penetration.

With regard to the compression molding of the mixture, this is conveniently accomplished at pressures from about 0.5 to 30 tons/in.$^2$ with about 8 tons/in.$^2$ being preferred as previously mentioned.

The electrolyzing of the mixture after compression molding can be accomplished by immersing the compressed body in a liquid media in which the cadmium materials are soluble as hereinbefore noted. This media is ordinarily an aqueous solution of a salt, the anion of which is the same as that of a metal salt used in forming the electrode, e.g. a KI solution is used with $CdI_2$. When a mixture of CdO and NaCN is used, however, aqueous KOH, 4 N, is suitably employed to provide $Cd(CN)_4^=$ from which the cadmium is then electrodeposited onto the particles of conductive material. This procedure is in accordance with electroplating practice.

After being compressed the resulting article is energized as a cathode vs. a carbon or nickel anode during the electrolyzing treatment and currents of from about 20 to 125 ma. per square inch of apparent electrode surface are applied to the cathode.

With regard to the proportions of conductive material and cadmium material in the preparing of the electrodes of the present invention, the cadmium material can suitably range from 20 to 50 percent by weight of the aggregate of conductive material and cadmium material. However, lesser amounts of cadmium material can be used when the electrode is to be employed in short life, flash current operation and larger amounts can be used to provide electrodes for use in very long-life cells.

In addition to the cadmium electrodes hereinbefore particularly described, zinc, nickel, silver and lead-articles for use in the manufacture of electrodes can be prepared in a similar manner in accordance with the present invention.

Suitable formulations and process materials for the preparation of zinc, nickel, lead and silver electrodes are shown in Table I. The materials in the formulations presented are in accordance with standard electroplating techniques presently used for the efficient massive deposition of the corresponding metals.

TABLE I

| Type Electrode | Material | Sizing, mesh | Amount-weight, percent | Electroreduction Media |
|---|---|---|---|---|
| Zinc | Zn powder | 20-80 | 34.0 | 0.5 N NaOH. |
|  | ZnO powder | 20-200 | 18.0 |  |
|  | NaCN powder | 20-200 | 6.5 |  |
|  | NaOH powder | 20-200 | 15.5 |  |
|  | Binder |  | 15.3 |  |
|  | $H_2O$ |  | 10.7 |  |
| Nickel | Ni powder | 20-80 | 40.0 | 0.5 N $NiSO_4 \cdot 6H_2O$. |
|  | $NiSO_4 \cdot 6H_2O$ | 20-200 | 32.0 |  |
|  | $NiCl_2 \cdot 6H_2O$ | 20-200 | 4.8 |  |
|  | Boric Acid | 20-200 | 3.2 |  |
|  | Binder |  | 14.0 |  |
|  | $H_2O$ |  | 6.0 |  |
| Silver | Ag powder | 20-80 | 45.0 | 0.5 KOH. |
|  | AgCN powder | 20-200 | 13.3 |  |
|  | KCN powder | 20-200 | 13.9 |  |
|  | $K_2CO_3$ | 20-200 | 6.3 |  |
|  | KOH | 20-200 | 3.7 |  |
|  | Binder |  | 12.0 |  |
|  | $H_2O$ |  | 5.8 |  |
| Lead | Lead powder | 20-80 | 48.5 | 0.2 N lead sulfamate. |
|  | Lead sulfamate | 20-200 | 28.0 |  |
|  | Sulfamic acid | 20-200 | 4.0 |  |
|  | Binder |  | 19.5 |  |

In addition to the specific ionizable materials set forth in Table I other soluble salts such as nickel fluoborate and nickel fluosilicate can be conveniently used in the preparation of nickel electrodes. Also lead fluoborate and lead fluosilicate can be used in the preparation of lead electrodes. Materials which form alkali cyanide complexes are preferred for the preparation of silver and zinc electrodes. However, zinc electrodes can be advantageously prepared using zinc salts or mixtures of zinc salts which hydrolyze acidically, such as for example zinc sulfate, or zinc sulfate with potassium acid sulfate.

The lead, nickel and silver articles which are produced following the processing procedure previously described can be made into cathodes by a subsequent treatment which involves the conversion of the electrodeposited metal to oxide.

This subsequent treatment is conventional and involves anodizing the electrode for example using 6 N NaOH to form nickel oxide or 6 N KOH to form the silver oxide. With lead electrodes, the surface of spongy lead is converted to lead sulfate in a sulfuric acid solution and then electrolytically oxidized to $PbO_2$ in the sulphuric acid solution. A more detailed description of a suitable technique is disclosed in the Journal of Electrochemical Society, Vol. 103, p. 87 (1956).

Alternatively, lead oxide cathodes can be made directly by subjecting the compression molded body containing the lead compound to an anodic oxidation treatment to directly electroform the active lead oxide upon the conductive substrate. For example, the compression molded body containing lead sulfamate as recited in Table I can be immersed in 0.2 N lead sulfamate solution, energized as an anode (vs. an inert cathode such as carbon) and the lead oxide is formed directly on the substrate. In this instance, the lead powder is preferably replaced by a more inert conductive material such as nickel powder.

The following examples are provided to further illustrate the present invention.

Example I [1]

Acetylene black, graphite sized 70–80% through 200 mesh and $CdI_2$ sized in the range of 20 to 200 mesh were tumble blended with minor amounts of binder and water. The mixture constituents were as follows:

|  | Percent by weight |
|---|---|
| $CdI_2$ | 44.4 |
| Acetylene black | 6.7 |
| Graphite | 22.4 |
| Binder | 15.3 |
| Water | 11.2 |

After blending, the mixture was compression molded at 8 tons/in.² on an expanded nickel substrate. The resulting body had dimensions of 2″ x 3″ x 0.020″ and was immersed after molding in an aqueous solution of 1 N KI and cathodically energized. A current of about 60 milliamperes per square inch was applied to the compressed body for about 2 hours. This was accomplished in a beaker using a copper oxide rectifier as the source of direct current. A carbon electrode was used as the anode. At the end of this time, $CdI_2$ had been reduced to metal which was electrodeposited on the acetylene black and graphite.

The thus formed electrode was removed from the solution, blotted and then tested vs. a zinc electrode in a cell containing 12 N KOH. The limiting current density of this electrode was found to be 180 to 190 ma./in.² of electrode.

Example II

The procedure of Example I was repeated using 44.4 percent by weight of $CdCl_2 \cdot 2\frac{1}{2}H_2O$ in place of $CdI_2$.

The limiting current density for this electrode was found to be 350 ma./in.²

---
[1] The binder used in all examples is polyvinyl "Formvar."

Example III

The procedure of Example I was repeated using 44.4 percent by weight of $CdBr_2 \cdot 4H_2O$ in place of $CdI_2$.

The limiting current density for this electrode was found to be 280 to 300 ma./in.$^2$.

Example IV

Iron powder sized in the range of 60 to 300 mesh and $Cd(C_2H_3O_2)_2$ sized in the range of 20 to 200 mesh were tumble blended with a minor amount of binder. The mixture constituents were as follows:

| | Percent by weight |
|---|---|
| Fe | 32.8 |
| $Cd(C_2H_3O_2)_2$ | 50.0 |
| Binder | 17.2 |

After blending, the mixture was subsequently treated in the manner of Example I to form an electrode.

The limiting current density of this electrode was 500 to 525 ma./in.$^2$.

Example V

The procedure of Example IV was repeated using 50.0 percent by weight of $CdSO_4 \cdot 8H_2O$ in place of $Cd(C_2H_3O_2)_2$.

The limiting current density for this electrode was found to be 500 to 525 ma./in.$^2$.

Example VI

The procedure of Example IV was repeated using 50.0 percent by weight of $CdI_2$ in place of $Cd(C_2H_3O_2)_2$.

The limiting current density for this electrode was found to be 500 to 525 ma./in.$^2$.

Example VII

The procedure of Example IV was repeated using 50.0 percent by weight of $CdBr_2 \cdot 4H_2O$ in place of $$Cd(C_2H_3O_2)_2$$

The limiting current density for this electrode was found to be 500 to 550 ma./in.$^2$.

Example VIII

The procedure of Example IV was repeated using 50.0 percent by weight of $CdCl_2 \cdot 2\frac{1}{2} H_2O$ in place of $$Cd(C_2H_3O_2)_2$$

The limiting current density for this electrode was found to be 600 to 650 ma./in.$^2$.

Example IX

Iron powder sized in the range of 60 to 300 mesh and NaCN and CdO sized in the range of 20 to 200 mesh were tumble blended with minor amounts of binder and water. The mixture constituents were as follows:

| | Percent by weight |
|---|---|
| Fe | 29.1 |
| CdO | 22.2 |
| NaCN | 22.2 |
| Binder | 15.3 |
| Water | 11.2 |

After blending, the mixture was subsequently treated in the manner of Example I except that an aqueous KOH, 4 N, solution was used in the electrolyzing step.

The limiting current density of the resultant electrode was 500 ma./in.$^2$.

Example X

Finely divided graphite sized 80% through 200 mesh and NaCN and CdO sized in the range of 20 to 200 mesh were tumble blended with minor amounts of binder and water. The mixture constituents were as follows:

| | Percent by weight |
|---|---|
| CdO | 25.6 |
| Graphite | 22.4 |
| NaCN | 25.5 |
| Binder | 19.5 |
| Water | 7.0 |

After blending, the mixture was subsequently treated in the manner of Example I except that an aqueous KOH solution, 4 N, was used in the electrolyzing step.

The limiting current density of the resultant electrode was 167 ma./in.$^2$.

Example XI

The procedure of Example I was repeated using 44.4 percent by weight $CdSO_4 \cdot 8H_2O$ in place of $CdI_2$.

The limiting current density of this electrode was found to be 380 ma./in.$^2$.

All of the electrodes of the foregoing examples have limiting current densities suitable for high-rate rechargeable appliance battery applications. However, as shown, the electrodes of Examples II through IX and XI have very high limiting current densities and the electrodes of Examples IV through IX have superior properties in this respect.

The mesh sizes referred to herein are Tyler Series.

What is claimed is:

1. A process for making articles for use as electrodes in which the active material is a material selected from the group consisting of cadmium, nickel, silver, lead, zinc and lead oxide which comprises providing a mixture of finely divided electrically conductive material and finely divided soluble material which forms upon dissolution an ion containing the metal constituent of the selected material; compression molding said mixture to form a body containing said admixed electrically conductive material and said soluble material, immersing said compression molded body in an aqueous solution to cause dissolution of said soluble material and electrically energizing said compression molded body to cause electrodeposition of the selected material onto said conductive particles.

2. A process in accordance with claim 1 wherein said selected material is nickel and wherein the electrodeposited metal obtained by the process is subsequently converted to the oxide by an anodizing treatment to render the article suitable for use as a cathode.

3. A process in accordance with claim 1 wherein said selected material is silver and wherein the electrodeposited silver obtained by the process is subsequently converted to the oxide by an anodizing treatment to render the article suitable for use as a cathode.

4. A process in accordance with claim 1 wherein said selected material is lead and wherein the electrodeposited lead obtained by the process is subsequently converted to the oxide by an anodizing treatment to render the article suitable for use as a cathode.

References Cited by the Examiner

UNITED STATES PATENTS

| 2,616,939 | 11/1952 | Fischbach | 136—120 |
| 2,642,469 | 6/1953 | Gary | 136—29 |
| 2,737,541 | 3/1956 | Coolidge | 204—20 |
| 2,849,519 | 8/1958 | Freas | 136—20 |
| 3,009,980 | 11/1961 | Corren et al. | 136—24 |
| 3,184,338 | 5/1965 | Mueller | 136—24 |
| 3,184,339 | 5/1965 | Ellis | 136—75 |
| 3,214,297 | 10/1965 | Horn et al. | 136—24 |

JOHN H. MACK, Primary Examiner.

HOWARD S. WILLIAMS, Examiner.

T. TUFARIELLO, Assistant Examiner.